(12) United States Patent
Heeter

(10) Patent No.: US 7,561,402 B2
(45) Date of Patent: Jul. 14, 2009

(54) GAP LIGHTNING SURFACE PROTECTION OF COMPOSITE STRUCTURES

(75) Inventor: Russell J. Heeter, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 437 days.

(21) Appl. No.: 11/361,924

(22) Filed: Feb. 24, 2006

(65) Prior Publication Data

US 2007/0201179 A1 Aug. 30, 2007

(51) Int. Cl.
*H02H 3/22* (2006.01)
(52) U.S. Cl. ...................................... 361/212; 361/218
(58) Field of Classification Search ................. 361/212, 361/217, 218
See application file for complete search history.

(56) References Cited

U.S. PATENT DOCUMENTS

| 3,989,984 | A | * | 11/1976 | Amason et al. | 361/212 |
| 4,628,402 | A | * | 12/1986 | Covey | 361/218 |
| 4,796,153 | A | * | 1/1989 | Amason et al. | 361/218 |
| 6,582,172 | B2 | * | 6/2003 | Nickerson et al. | 411/371.1 |
| 7,307,825 | B2 | * | 12/2007 | De La Fuente De Ana et al. | 361/212 |

* cited by examiner

*Primary Examiner*—Danny Nguyen
(74) *Attorney, Agent, or Firm*—Klein, O'Neill & Singh, LLP

(57) ABSTRACT

A method and system of preventing lighting from puncturing composite surfaces is provided. The method includes reconfiguring plies of a composite surface so that a composite conductive ply is located on the outer surface of the composite surface and a non-conductive composite ply is located directly underneath the conductive ply and inserting a flashover point between an outer edge of the conductive ply and a fastener attaching the composite surface to a support structure.

22 Claims, 3 Drawing Sheets

GAP LIGHTNING SURFACE PROTECTION OF COMPOSITE STRUCTURES

BACKGROUND OF THE INVENTION

1. Field of the Invention

The present invention relates to lightning protection and more particularly, preventing lightning from puncturing composite surfaces.

2. Background

External composite surfaces are susceptible to puncture when exposed to direct lightning attachment. Composite surfaces with underlying systems, such as hydraulic lines or fuel tubing, or structure require protection against the adverse effects of lightning because a puncture in the composite surface could result in a catastrophic failure, such as a spark in a fuel tank. Typically, to provide protection against lightning, metal foils or interwoven wires are added to the composite surface. Although the addition of the metal foils or interwoven wires protects against the attachment of the lightning to the underlying systems, they are heavy, difficult to apply and require special processes to prevent surface cracking due to coefficient of thermal expansion differences.

Parts of aircrafts, such as the fixed wing, wing to body fairing and empennage are being increasingly constructed of composite surfaces. It has been estimated that on average, each airplane in the U.S. commercial fleet is struck by lightning more than once each year. In fact, aircraft often trigger lightning when flying through a heavily charged region of a cloud. In these instances, the lightning flash originates at the airplane and extends away in opposite directions. To prevent catastrophic failures, a method and system are needed for preventing lightning from puncturing composite surfaces that are cost effective and add minimal parasitic weight.

SUMMARY OF THE PRESENT INVENTION

In one aspect of the present invention, a method of preventing lighting from puncturing composite surfaces is provided. The method includes reconfiguring plies of a composite surface so that a conductive ply is located on the outer surface of the composite surface and a non-conductive ply is located directly underneath the conductive ply and inserting a flashover point between an outer edge of the conductive ply and a fastener attaching the composite surface to a support structure.

In another aspect of the present invention, a protection system for preventing lightning from puncturing composite surfaces is provided. The system includes a composite surface having a composite conductive ply directly on top of non-conductive composite ply; a support structure; and a flashover device, between an outer edge of the conductive ply and a fastener, attaching the composite surface to the support structure.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

The following detailed description is of the best currently contemplated modes of carrying out the invention. The description is not to be taken in a limiting sense, but is made merely for the purpose of illustrating the general principles of the invention, since the scope of the invention is best defined by the appended claims.

According to the present invention, an improved, cost effective and light weight protection method and system to prevent lightning from puncturing composite surfaces (or "panels" or "structures") is provided. Although the method of the present invention is implemented using an aircraft, those skilled in the art will recognize that the principles and teachings described herein may be applied to a variety of structures with composite surfaces, such as automobiles and antenna radomes.

Figure 1A:
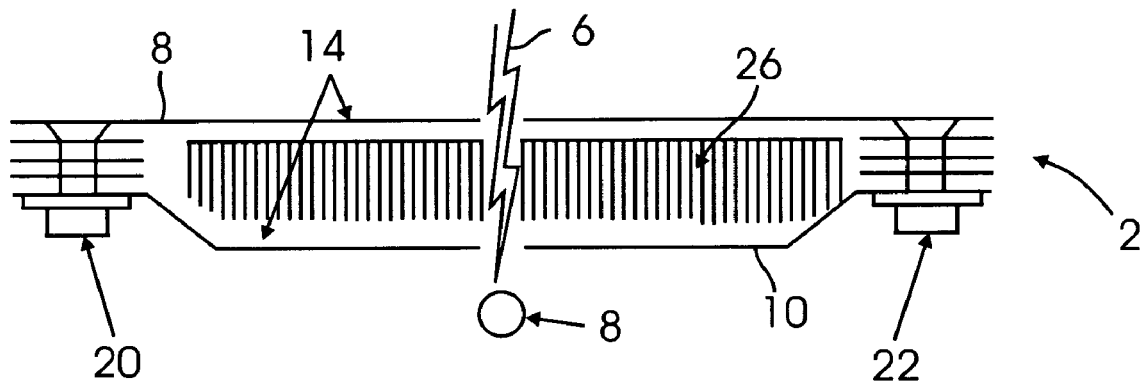
FIG. 1a illustrates a typical prior art composite panel exposed to lightning.
Figure 1B:
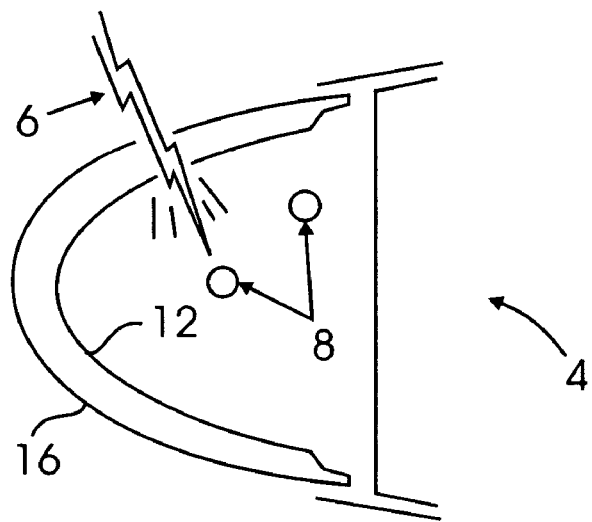
FIG. 1b illustrates a typical prior art fixed leading edge composite surface exposed to lightning.

FIGS. 1a and 1b illustrate a typical prior art composite panel 2 and fixed leading edge composite panel 4 exposed to lightning 6. Direct contact of lightning 6 can occur on panels with conductive or non-conductive plies that cover underlying systems (or "structures") 8 located close to inner surfaces 10, 12 of panels 2, 4. Non-conductive plies 14 are electrically transparent to lightning 6 and are subject to puncture, while conductive plies in composite panels may not be thick enough to prevent puncture.

Traditional methods and systems of preventing punctures to protection systems have included adding metallized surface protection on outer surfaces 16, 18 of composite panels 2, 4. The addition of the metallized surface protection allows current generated from lightning 6 to flow through outer surfaces 16, 18 of panels 2, 4 to supporting structures which can include numerous fasteners, such as first and second fasteners 20, 22, attached to the primary structure. The performance of the lightning protection system depends on the ply composition and surface protection configuration of composite panels.

Conventional composite panels 2, 4 are comprised of several plies 26 of fiberglass stacked up. By changing composite panels 2, 4 to include a hybrid stack up, for example, fiberglass is mixed with carbon fiber reinforced plastic (CFRP), the sequence of the ply layers can be changed which results in the reduction of the number of plies and subsequently a reduction in weight. Instead of using three plies of fiberglass, a single fiberglass hybrid and a single CFRP ply can be utilized. A hybrid ply can be comprised of fiberglass, KEVLAR® or the combination of fiberglass or KEVLAR® and CFRP.

Figure 2A:
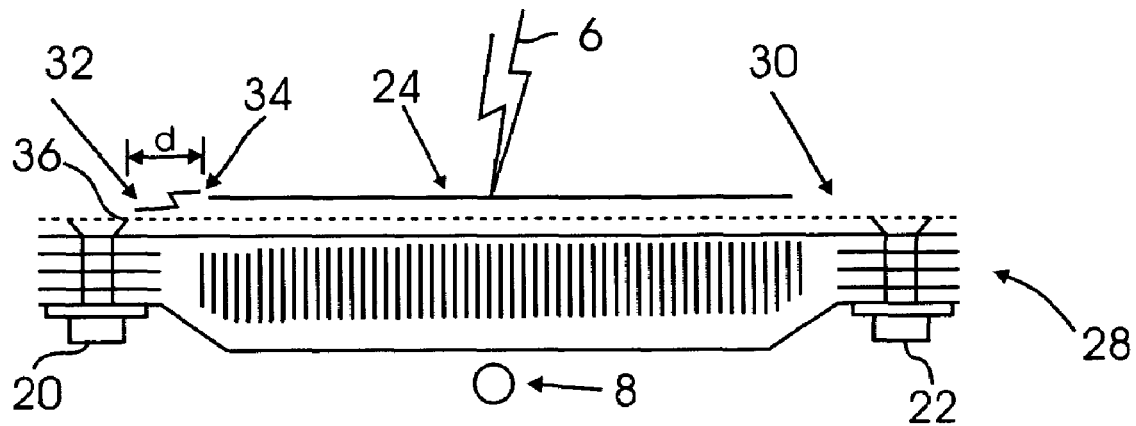
FIG. 2a illustrates a side view of a composite panel, according to one aspect of the present invention.
Figure 2B:
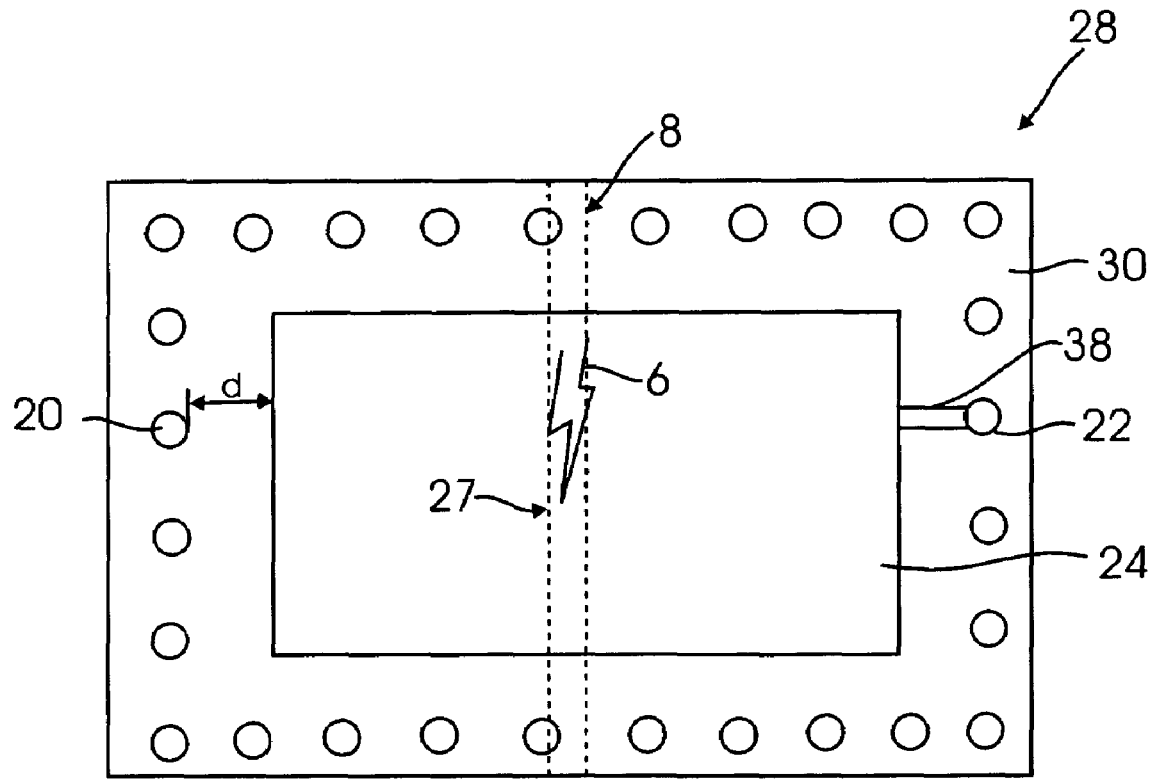
FIG. 2b illustrates a top view of the composite panel in FIG. 2a having a conductive strip.
Figure 2C:
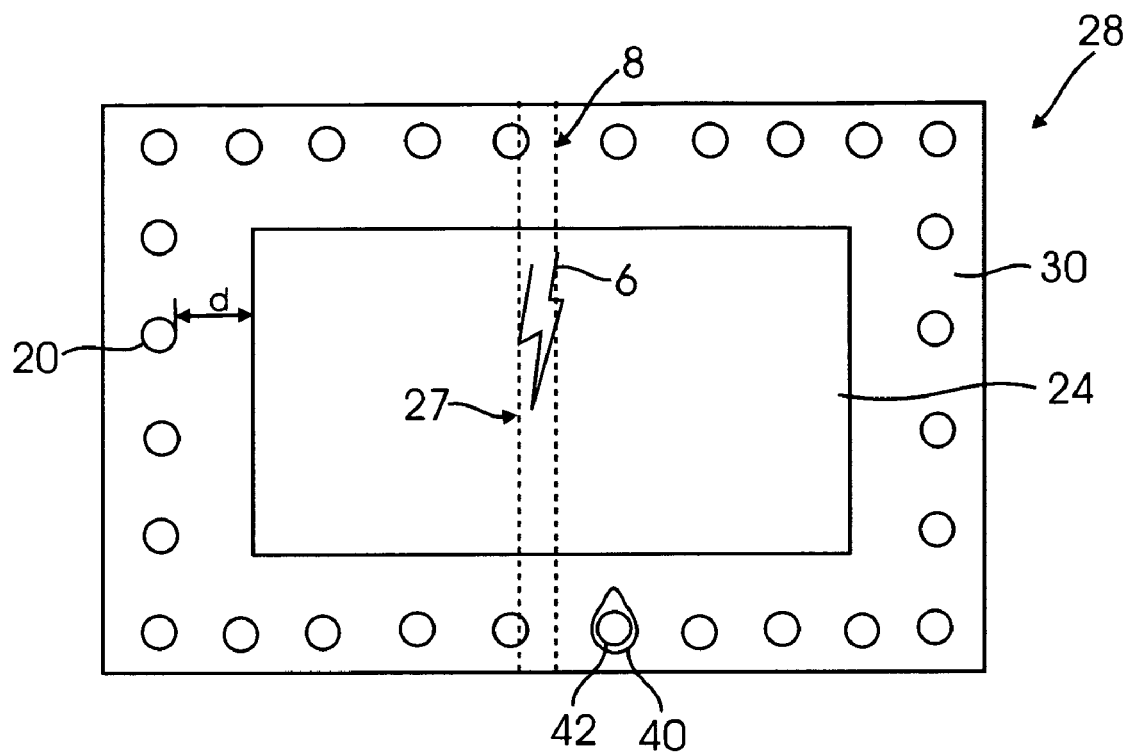
FIG. 2c illustrates a top view of the composite panel in FIG. 2a having a leader initiator insert.

Turning to FIGS. 2a-c, a composite panel 28 according to the present invention is provided. The configuration of the stack up of the plies in composite panel 28 is re-arranged so that a conductive ply 24 is located on the outer surface of composite panel 28 and is directly on top of a non-conductive ply 30. As a result, composite panels can be provided the same level of protection against lightning attachment 27 at less cost, less weight and greater simplicity. The first two plies 24, 30 play a crucial role in preventing puncture and by configuring non-conductive ply 30 under conductive ply 24, lightning currents to conductive ply 28 of composite panel 28 are isolated. The remaining underlying plies can be configured in any order.

In addition to re-arranging the ply lay up, a flashover point (or "device") 32 is added between edge 34 of outer conductive ply 24, generally comprised of CFRP, and first fastener 20 to prevent galvanic corrosion as the carbon fibers in the CFRP do not come into contact with first fastener 20. When lightning attaches 6 anywhere on outer conductive ply 24, a voltage occurs between edge 34 of outer conductive ply 24 and first fastener 20. If this voltage is high enough to create an ionized path between edge 34 of outer conductive ply 24 and fastener edge 36, puncture will occur. Flashover (or "device") 32 creates a length or distance "d", which is the distance between edge 34 of outer conductive ply 24 and first fastener 20, to minimize the likelihood of puncture to underlying systems 8 as the flashover voltage between conductive ply 24 and first fastener 20 will be reduced. System 8 can be any underlying system, for example, a fuel tube, hydraulic systems or any other system. Instead of lightning 6 attaching to underlying systems 8, the current produced by lightning 6 flashes over and flows through first fastener 20. In other words, lightning 6 attaches to conductive ply 24 causing current to flow through conductive surface 24 and flash over distance "d" to first fastener 20.

In a preferred embodiment, distance "d" is a quarter inch (0.25 in) so voltage occurs between conductive ply 24 and first fastener 20, while allowing the current to divert along the surface of panel 28 only and not puncture and attach to underlying systems 8. Flashover (or "device") 32 provides a lightning current path to surrounding structure.

If distance "d" is required to be so large that the resulting flashover voltage is greater than the puncture voltage, additional devices, such as conductive strips and leader initiator inserts are required to prevent puncture. As shown in the top-view of FIG. 2b, a conductive strip 38 is applied from conductive ply 24 to a second fastener 22 of composite panel 28. Conductive strip 38 reduces the voltage required for lightning current to flow from conductive ply 24 over to second fastener 22. Conductive strip 38 is made from copper or other type of (galvanically compatible metal) conductive material that electrically grounds conductive ply 24 to second fastener 22. Conductive strip 38 can be part of the lay up built into composite panel 28.

Alternatively, a leader initiator insert 40 can be inserted on a third fastener 42, as shown in the top-view of FIG. 2c. Leader initiator insert 40 is comprised of metal and has a sharp point directed toward the edge of conductive ply 24 to reduce flashover voltage and the likelihood of puncture. Leader initiator insert 40 is only required if distance "d" is large enough to cause the flashover voltage to be greater than the puncture voltage. For example, if the design of a composite panel requires distance "d" to be an inch between conductive ply 24 and first fastener 20 to prevent corrosion, leader initiator insert 40 can also be inserted so lightning protection is provided and galvanic corrosion is prevented.

Figure 3:
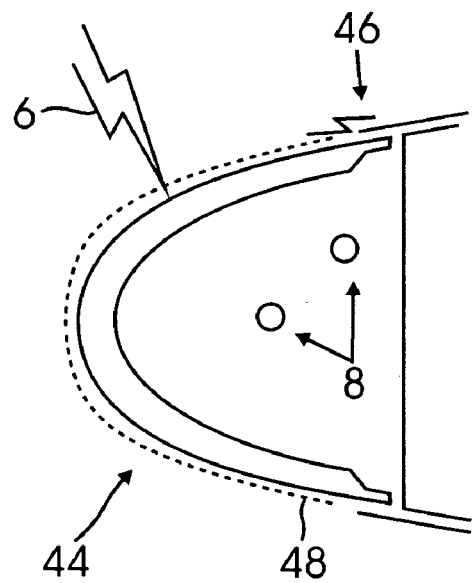
FIG. 3 illustrates a fixed leading edge composite panel, according to one aspect of the present invention.

FIG. 3 illustrates the method and system described above applied to a fixed leading edge composite panel 44. Lightning 6 attaches to a conductive ply of fixed leading edge composite panel 44 producing a current which causes an arc of voltage 46 on outer surface 48 of panel 44. As a result, lightning 6 does not attach to underlying systems 8 preventing a failure of underlying systems 8.

Although the present invention has been described with reference to specific embodiments, these embodiments are illustrative only and not limiting. Many other applications and embodiments of the present invention will be apparent in light of this disclosure and the following claims.

What is claimed is:

1. A method of preventing lightning from puncturing a composite panel, the method comprising:
   configuring plies of the composite panel so that a conductive ply forms an outer surface of the composite panel and a non-conductive ply is located directly underneath the conductive ply; and
   securing the composite panel to a support structure using at least one fastener;
   wherein the fastener is laterally spaced from the conductive ply by a distance d, and the fastener is not covered by the non-conductive ply, such that the distance d creates a flashover point between an outer edge of the conductive ply and the uncovered fastener.

2. The method of claim 1, wherein the length of the flashover point is about 0.25 inches.

3. The method of claim 1, further comprising placing a conductive strip between the conductive ply and the fastener.

4. A method of preventing lightning from puncturing a composite surface, the method comprising:
   configuring plies of a composite surface so that a conductive ply is located on the outer surface of the composite surface and a non-conductive ply is located directly underneath the conductive ply;
   inserting a flashover point between an outer edge of the conductive ply and a fastener, the fastener attaching the composite surface to a support structure; and
   placing a pointed leader initiator insert over the fastener with a point of the pointed leader initiator insert directed toward the outer edge of the conductive ply.

5. The method of claim 3, wherein the conductive strip reduces the voltage required for lightning current to flow from the conductive ply over to the fastener.

6. The method of claim 1, wherein the conductive ply comprises carbon fiber reinforced plastic (CFRP).

7. The method of claim 1, wherein the non-conductive ply is selected from the group consisting of para-aramids and fiberglass.

8. A protection system for preventing lightning from puncturing a composite panel, comprising:
   conductive ply forming an outer surface of the composite panel;
   a non-conductive ply located directly underneath the conductive ply;
   a support structure; and
   a fastener securing the composite panel to the support structure;
   wherein the fastener is laterally spaced from the conductive ply by a distance d, and the fastener is not covered by the non-conductive ply, such that the distance d creates a flashover device between an outer edge of the conductive ply and the uncovered fastener.

9. The system of claim 1, wherein the length of the flashover device is about 0.25 inches.

10. The system of claim 8, further comprising a conductive strip between the conductive ply and the fastener.

11. A protection system for preventing lighting from puncturing composite surfaces, comprising:

a composite surface having a conductive ply directly on top of non-conductive ply;

a support structure;

a flashover device between an outer edge of the conductive ply and a fastener, the fastener attaching the composite surface to the support structure; and a pointed leader initiator insert secured to the fastener, with a point of the pointed leader initiator insert directed toward the outer edge of the conductive ply.

12. The system of claim 9, wherein the conductive strip reduces the voltage required for lightning current to flow from the conductive ply over to the fastener.

13. The system of claim 8, wherein the conductive ply comprises carbon fiber reinforced plastic (CFRP).

14. The system of claim 8, wherein the non-conductive ply is selected from the group consisting of para-aramids and fiberglass.

15. The method of claim 4, wherein the length of the flashover point is 0.25 inches.

16. The method of claim 4, further comprising placing a conductive strip between the conductive ply and the fastener.

17. The method of claim 4, wherein the conductive ply comprises carbon fiber reinforced plastic (CFRP).

18. The method of claim 4, wherein the non-conductive ply is selected from the group consisting of para-aramids and fiberglass.

19. The system of claim 11, wherein the length of the flashover device is 0.25 inches.

20. The system of claim 11, further comprising a conductive strip extending between the conductive ply and the fastener.

21. The system of claim 11, wherein the conductive ply comprises carbon fiber reinforced plastic (CFRP).

22. The system of claim 11, wherein the non-conductive ply is selected from the group consisting of para-aramids and fiberglass.

* * * * *